(12) United States Patent
Therien (10) Patent No.: US 10,810,980 B1
(45) Date of Patent: Oct. 20, 2020

(54) SUPPORT STRUCTURE FOR RESONATING AND/OR VIBRATION-SENSITIVE DEVICES

(71) Applicant: David Therien, San Rafael, CA (US)

(72) Inventor: David Therien, San Rafael, CA (US)

( * ) Notice: Subject to any disclaimer, the term of this patent is extended or adjusted under 35 U.S.C. 154(b) by 0 days.

(21) Appl. No.: 16/411,832

(22) Filed: May 14, 2019

Related U.S. Application Data

(63) Continuation-in-part of application No. 16/028,487, filed on Jul. 6, 2018, now abandoned.

(60) Provisional application No. 62/529,089, filed on Jul. 6, 2017.

(51) Int. Cl.
*G10G 5/00* (2006.01)
*F16M 11/04* (2006.01)
*G10D 13/02* (2020.01)
*G10D 13/10* (2020.01)

(52) U.S. Cl.
CPC ............ *G10G 5/005* (2013.01); *F16M 11/04* (2013.01); *G10D 13/02* (2013.01); *G10D 13/28* (2020.02)

(58) Field of Classification Search
CPC ............ F16F 15/08; F16M 7/00; G10G 5/005
USPC ............ 248/615; 267/140.12, 140.13, 141.1, 267/141.2
See application file for complete search history.

(56) References Cited

U.S. PATENT DOCUMENTS

| | | | | |
|---|---|---|---|---|
| 700,977 A * | 5/1902 | Olsen | ..................... | A47B 91/12 248/346.11 |
| 1,350,014 A * | 8/1920 | Eckerman | ................ | B41J 29/08 16/86 A |
| 1,374,029 A * | 4/1921 | Prickett | .................. | A47B 91/12 16/42 R |
| 1,969,266 A * | 8/1934 | Herold | .................. | F16F 1/3713 16/42 R |
| 2,553,269 A * | 5/1951 | Oldofredi | ................. | F16F 1/12 267/178 |
| 2,631,330 A * | 3/1953 | Becker | ..................... | A47B 91/04 16/30 |
| 2,744,283 A * | 5/1956 | Reineman | .............. | A47B 91/04 16/42 R |
| 3,235,244 A * | 2/1966 | Hein | ......................... | B63C 5/04 267/153 |
| 4,272,136 A * | 6/1981 | Sengua | ..................... | G07C 3/10 248/188.4 |
| 4,575,034 A * | 3/1986 | Tobey | .................. | A47B 91/066 248/188.9 |
| 4,979,786 A * | 12/1990 | Kuraseko | ............... | A47B 91/00 248/188.9 |
| 5,547,172 A * | 8/1996 | Corcoran | ................ | F16F 13/16 267/140.13 |

(Continued)

*Primary Examiner* — Joshua E Rodden
(74) *Attorney, Agent, or Firm* — Larry D. Johnson (57) ABSTRACT

A support structure for resonating and/or vibration-sensitive devices provides a portable, stationary, attachable, floating-framed or framed, suspended receptacle and surface wherein, upon or about which a stand, foot or other support means of a resonating and/or vibration-sensitive instrument or piece of equipment is placed or engaged and, in many use-cases, retained. The support structure allows independent, omnidirectional resilient micro-movement—essentially flexibly decoupling while yet securing the decouplement of the instrument or equipment, its stand, feet or other support means from/to its supporting surface or structure—thereby enabling fullest expression, performance and stability of the instrument or equipment.

14 Claims, 7 Drawing Sheets

(56) References Cited

U.S. PATENT DOCUMENTS

| | | | | |
|---|---|---|---|---|
| 5,881,981 | A * | 3/1999 | Yanagisawa | A47B 91/00 248/188.8 |
| 6,357,717 | B1 * | 3/2002 | Kennard, IV | F16F 1/44 248/562 |
| 6,536,725 | B2 * | 3/2003 | Fisher | A47B 91/022 248/188.4 |
| 6,773,000 | B2 * | 8/2004 | Oyama | F16F 1/128 267/136 |
| 7,441,742 | B2 * | 10/2008 | Kwon | D06F 39/125 248/188.2 |
| 7,640,868 | B2 * | 1/2010 | Morrison | H04R 1/026 108/91 |
| 7,744,050 | B2 * | 6/2010 | de Toledo | A47L 15/4253 248/188.3 |
| 8,505,887 | B2 * | 8/2013 | Harden | B60G 11/52 267/220 |
| 8,511,637 | B2 * | 8/2013 | Mitsch | F01D 25/28 248/615 |
| 8,561,962 | B1 * | 10/2013 | Butts | F16F 9/486 248/615 |
| 9,920,811 | B1 * | 3/2018 | Morrison | F16F 15/08 |
| 9,976,690 | B2 * | 5/2018 | Cornelissen | A47J 47/16 |
| 10,187,712 | B2 * | 1/2019 | Latvis, Jr. | H04R 1/026 |
| 2010/0039010 | A1 * | 2/2010 | Hong | D06F 39/125 312/351.3 |
| 2014/0033895 | A1 * | 2/2014 | Wiley | G10D 13/026 84/421 |
| 2015/0211592 | A1 * | 7/2015 | Rawson | F16F 1/3732 267/141.1 |
| 2018/0245266 | A1 * | 8/2018 | Zhao | A47B 91/005 |

\* cited by examiner

SUPPORT STRUCTURE FOR RESONATING AND/OR VIBRATION-SENSITIVE DEVICES

CROSS REFERENCE TO RELATED APPLICATIONS

The present application is a continuation-in-part of U.S. Utility patent application Ser. No. 16/028,487, filed Jul. 6, 2018, which claims the benefit of the filing date of U.S. Provisional Patent Application Ser. No. 62/529,089, filed Jul. 6, 2017. The foregoing applications are incorporated by reference in their entireties as if fully set forth herein.

TECHNICAL FIELD

This written description relates generally to musical, audio, recording or other resonating and/or vibration-sensitive devices and/or their support stands or other means of support as conventionally placed upon or attached to supporting surfaces or structures, and more particularly to implementations of a support structure for resonating and/or vibration-sensitive instruments or equipment. More specifically, such devices, including their support stands or other means of support, may include, but are not limited to, drums, cymbals, other percussion instruments, upright basses, cellos, microphones, speakers, amplifiers, turntables, video cameras and the like.

SUMMARY

Described below is a support structure for resonating and/or vibration-sensitive devices and/or their support stands or other means of support. Some implementations of the support structure provide a portable, stationary, attachable, framed or floating-framed, suspended receptacle and surface wherein, upon, against or about which a stand, foot or other support means of a resonating and/or vibration-sensitive instrument or piece of equipment is placed or engaged and, in many use-cases, retained for the purposes of (i) isolating the instrument or equipment from its supporting surface or structure in ways that a) minimize undesirable damping, dissipation or restriction of naturally-occurring and potential resonance, mechanical energy or movement of the instrument or equipment, b) allow, promote, and optimize desirable, naturally-occurring and potential resonance, mechanical energy or movement of the instrument or equipment, and c) prevent transmission of counter-productive vibrations or mechanical energy, often occurring in the supporting surface or structure, into the instrument or equipment, (ii) preventing undesirable gross movement or displacement (e.g. sliding) of the instrument or equipment upon/against its supporting surface or structure, and (iii) allowing the instrument or equipment, if/once retained, to be lifted and relocated as desired by the user without separation from the support structure. In some implementations, the support structure may mate, intersperse between, support, suspend, secure, isolate, and/or allow independent, omnidirectional resilient micro-movement—essentially flexibly decoupling while yet securing the decouplement—of the instrument, equipment, its stand, feet or other means of support, and its potentially adversely resonating or vibrating, deadening, sympathetically-vulnerable, slick and/or otherwise non-optimal supporting surface or structure, thereby enabling fullest expression, performance and stability of the instrument or equipment.

Particular embodiments of the subject matter described in this specification can be implemented so as to realize one or more of the above advantages.

In some implementations, embodiments of the support structure disclosed herein relate to use for 'kick drums' and 'floor toms', as well as cymbals, other percussion instruments, upright basses, cellos, microphones, speakers, amplifiers, turntables, video cameras, or other resonating and/or vibration-sensitive devices and/or their support stands/ means. The 'kick drum' being a type of bass drum so-named for its typical horizontal placement on or close to the floor and activation by the user's foot by means of a bass/kick drum pedal which translates downward force into the throwing forward of an attached beater into the head of the drum. The 'floor tom' being a type of tom-tom drum typically supported vertically above the floor by three legs and activated by the user by means of a hand-held drum stick brought downward onto the head of the drum. Both are conventionally employed in the assemblage of drums, cymbals and other mounted percussion instruments comprising what is known in the art as a 'trap set', 'drum set' or 'drum kit'.

While some specific embodiments of the support structure disclosed herein have been designed for use with kick drums and floor toms, as well as cymbals, other percussion instruments, upright basses, cellos, microphones, speakers, amplifiers, turntables, video cameras, or other resonating and/or vibration-sensitive devices and/or their support stands/ means, these embodiments do not limit the support structure's use only to these applications nor do they preclude anticipated modifications, subtractions and/or additions of elements, features, dimensions, materials or adaptive inserts or devices to make the support structure more and/or specifically useful and beneficial in these here-mentioned or other applications.

The details of one or more embodiments of the subject matter described in this specification are set forth in the accompanying drawings and the description below. Other features, aspects, and advantages of the subject matter will become apparent from the description, the drawings, and the claims.

Those skilled in the art will appreciate that the conception upon which this disclosure is based readily may be utilized as a basis for the designing of other structures, methods and systems that include one or more of the various features described below.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

DETAILED DESCRIPTION

Referring to FIGS. 1 through 10, wherein like reference numerals refer to like components in the various views, there are illustrated therein implementations of a support structure for resonating and/or vibration-sensitive devices, generally denominated 10 herein, such as may be used with kick or bass drums, floor toms, or other resonating and/or vibration-sensitive devices.

Figure 1:
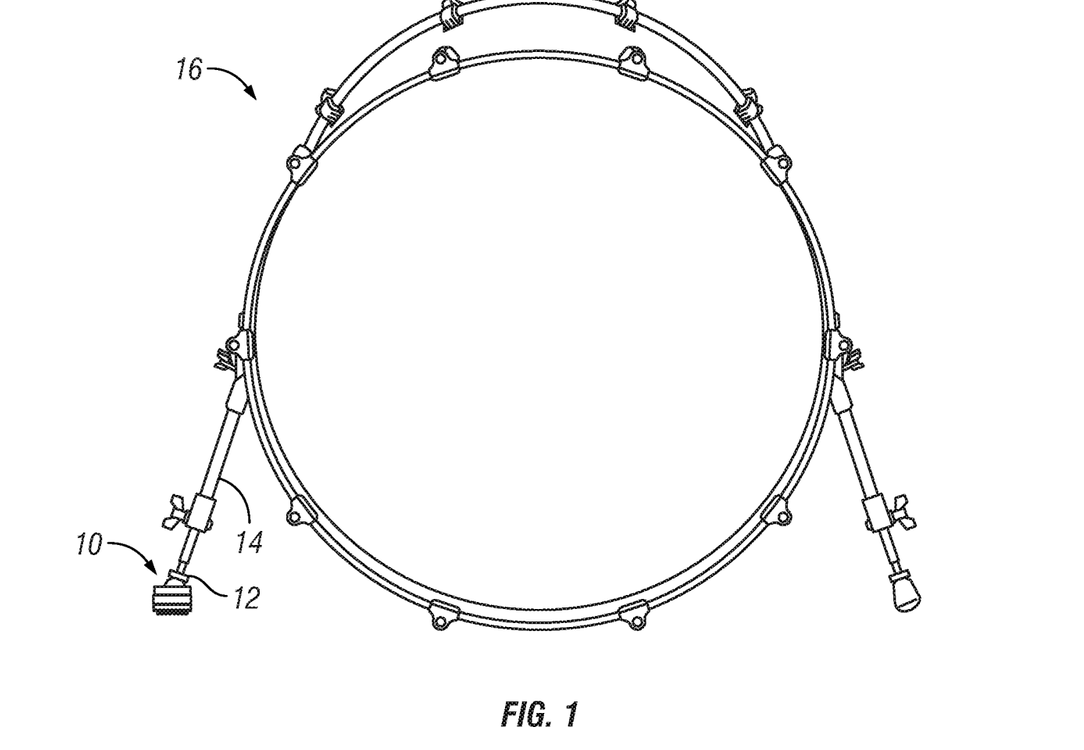
FIG. 1 is a view of one implementation of a support structure as affixed to a distal end of a support leg/stand for a kick or bass drum.

FIG. 1 is a view of one implementation of a support structure 10 as affixed to a distal end 12 of a support leg/stand 14 for a kick or bass drum 16.

Figure 2:
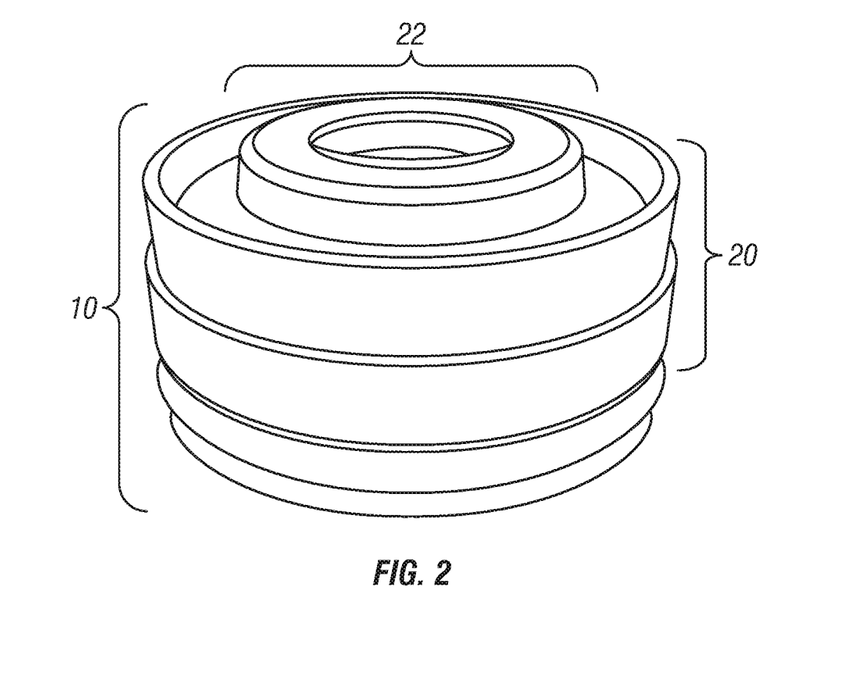
FIG. 2 is a view of one implementation of a support structure showing a rigid frame and receptacle.

FIG. 2 is a view of one implementation of a support structure 10 showing a rigid frame 20 and receptacle 22.

Figure 3:
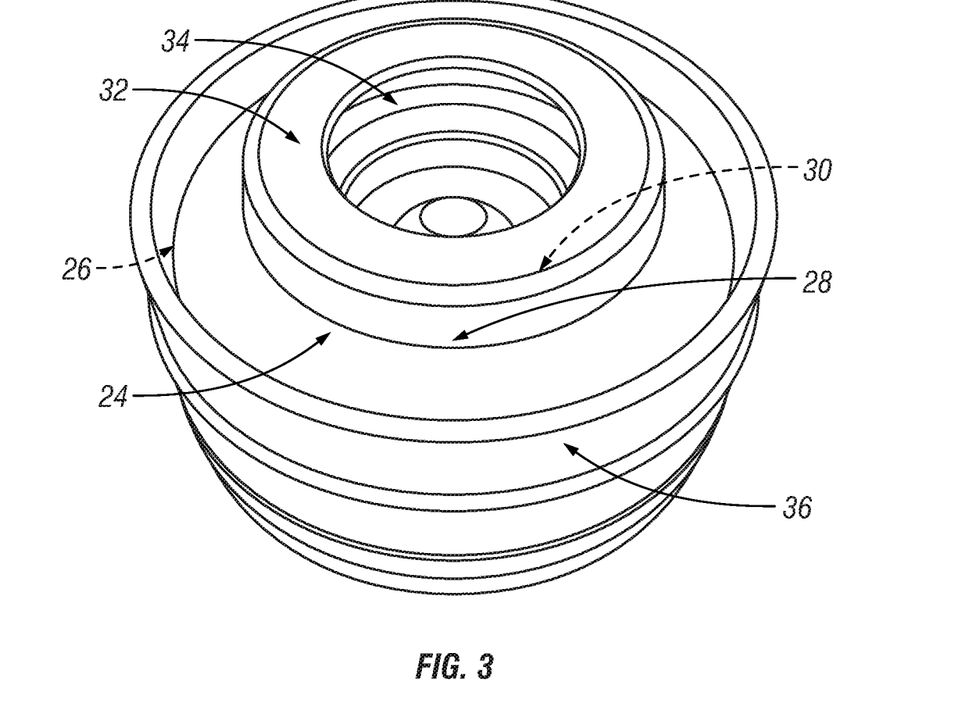
FIG. 3 is a view of one implementation of a support structure showing a resilient membrane, inner bearing edge, facing portion, upper circumferential support edge, suspended compliant membrane, interior core structure, and outer cuff.

FIG. 3 is a view of one implementation of a support structure showing a resilient membrane 24, inner bearing edge 26, facing portion 28, upper circumferential support edge 30, suspended compliant membrane 32, interior core structure 34, and outer cuff 36.

Figure 4:
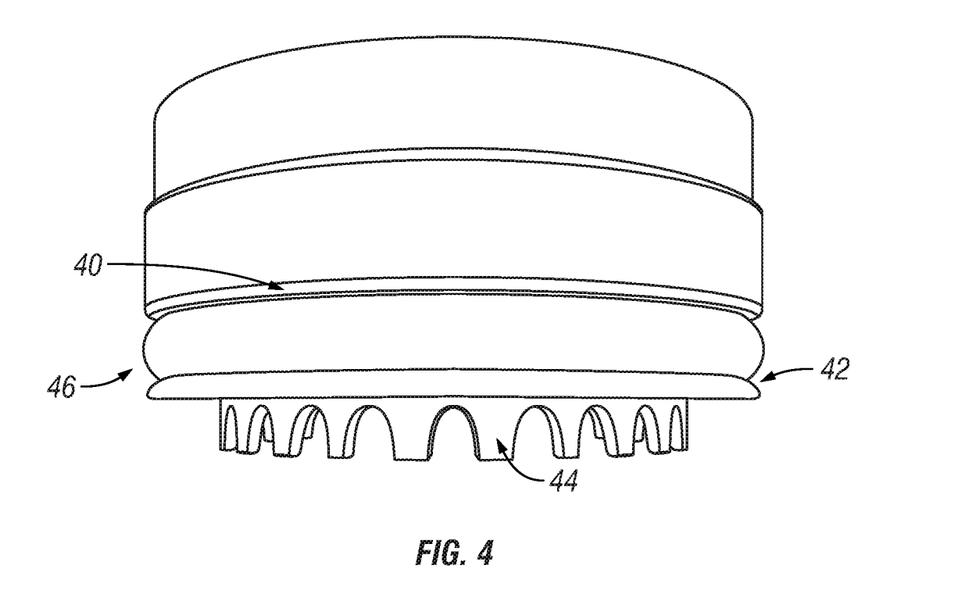
FIG. 4 is a view of one implementation of a support structure showing a bottom support means, base plate, protrusions, and loop of resilient material.

FIG. 4 is a view of one implementation of a support structure showing a bottom support means 40, base plate 42, protrusions 44, and loop of resilient material 46.

Figure 5:
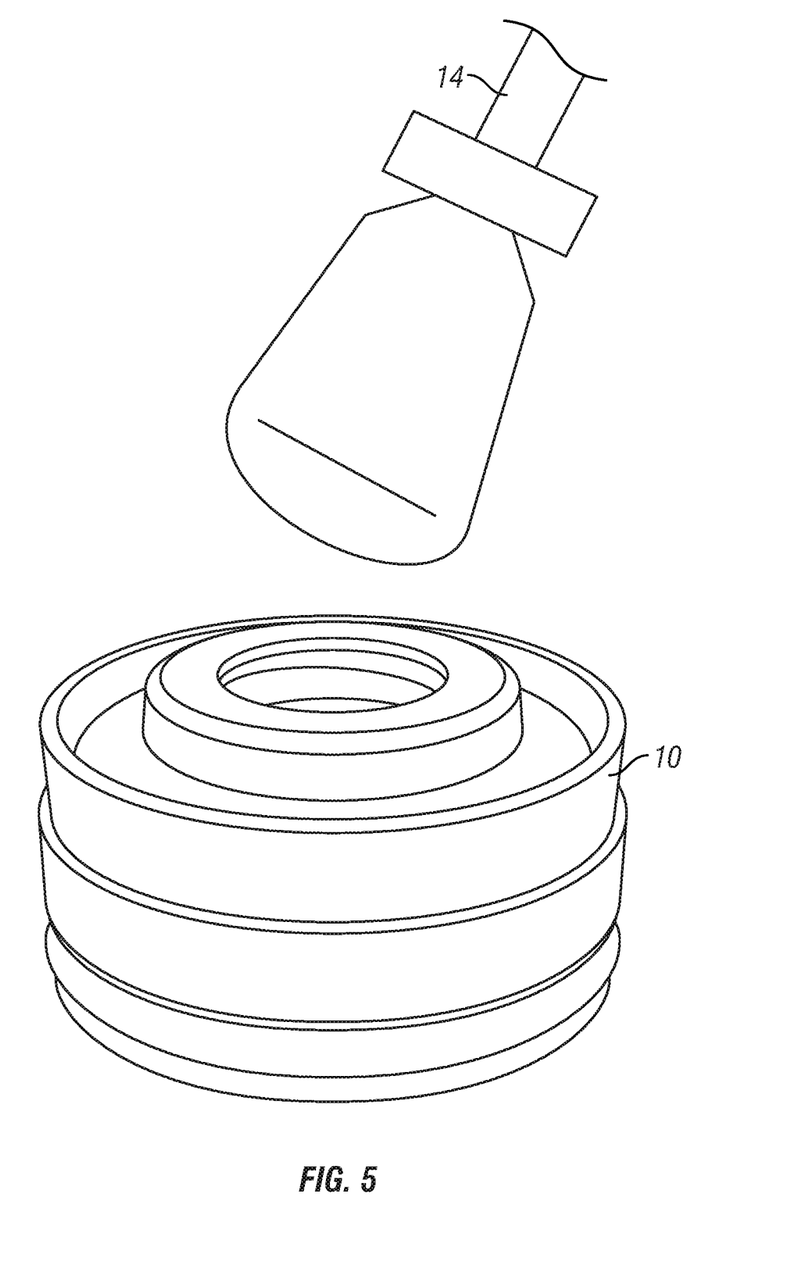
FIG. 5 is a view of a one implementation of a support leg above a support surface prior to insertion of the support leg into the support structure.

FIG. 5 is a view of a one implementation of a support leg 14 above a support surface prior to insertion of the support leg into a support structure 10.

Figure 6:
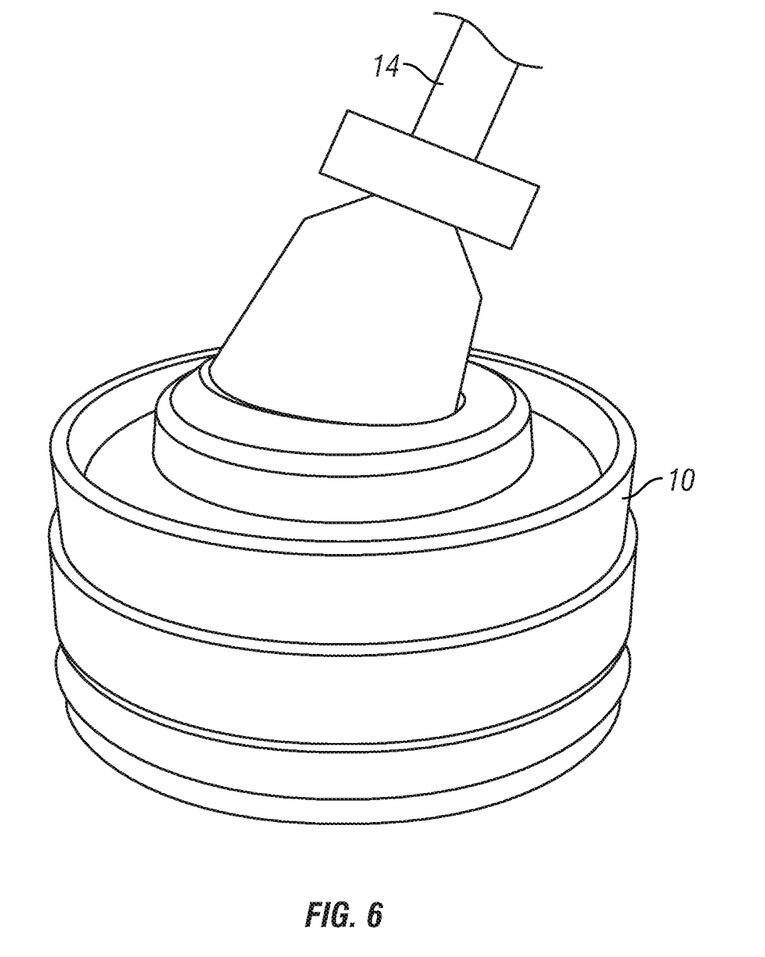
FIG. 6 is a view of a one implementation of a support leg as inserted into a support structure.

FIG. 6 is a view of a one implementation of a support leg 14 as inserted into a support structure 10.

Figure 7:
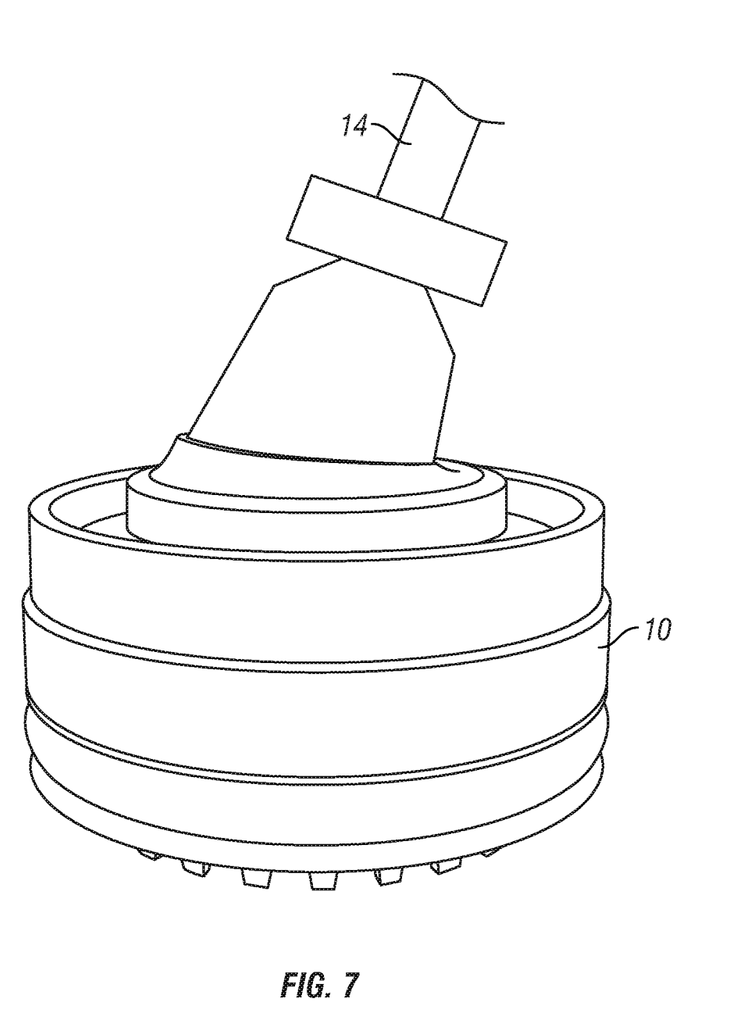
FIG. 7 is a view of a one implementation of a support leg and a support structure coupled together and raised from the underlying surface.

FIG. 7 is a view of a one implementation of a support leg 14 and a support structure 10 coupled together and raised from the underlying surface.

Figure 8:
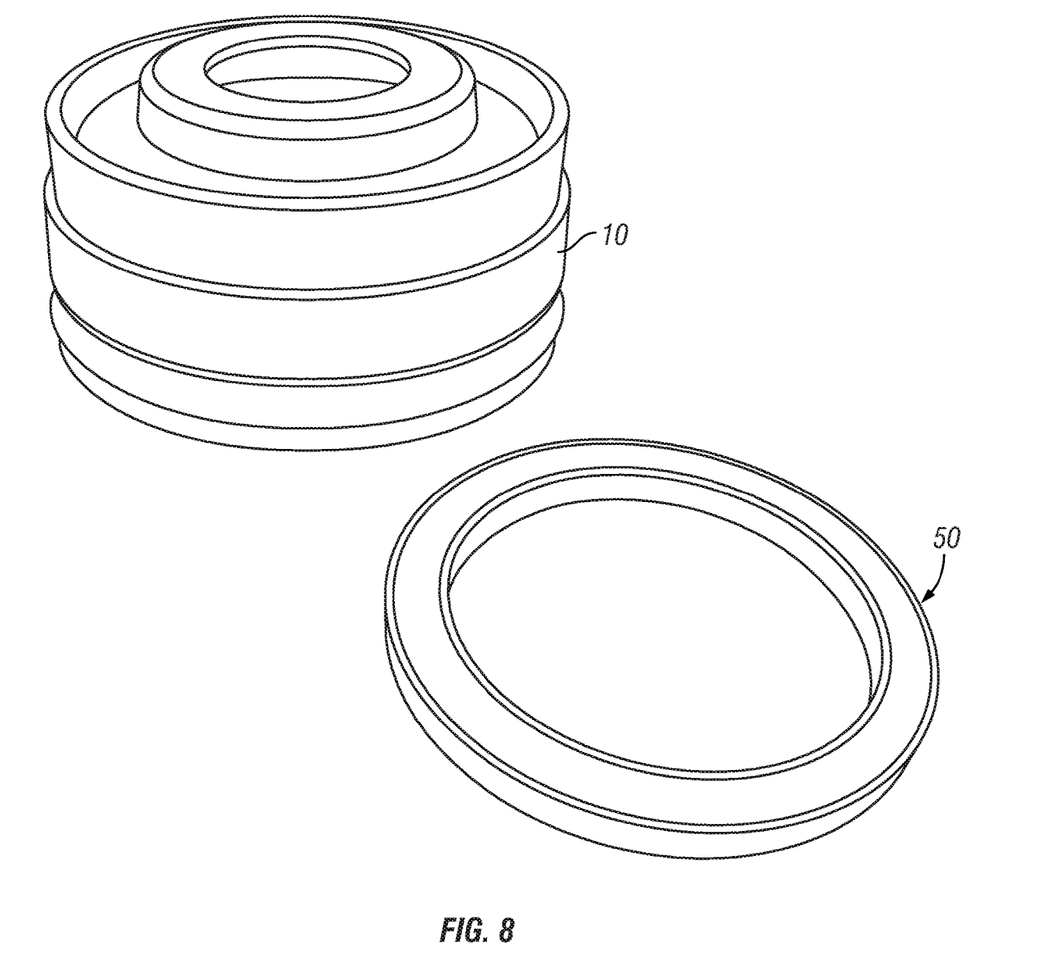
FIG. 8 is a view of a one implementation of a slip resistant material that may be used with a support structure.

FIG. 8 is a view of a one implementation of a slip resistant material 50 that may be used with a support structure 10.

Figure 9:
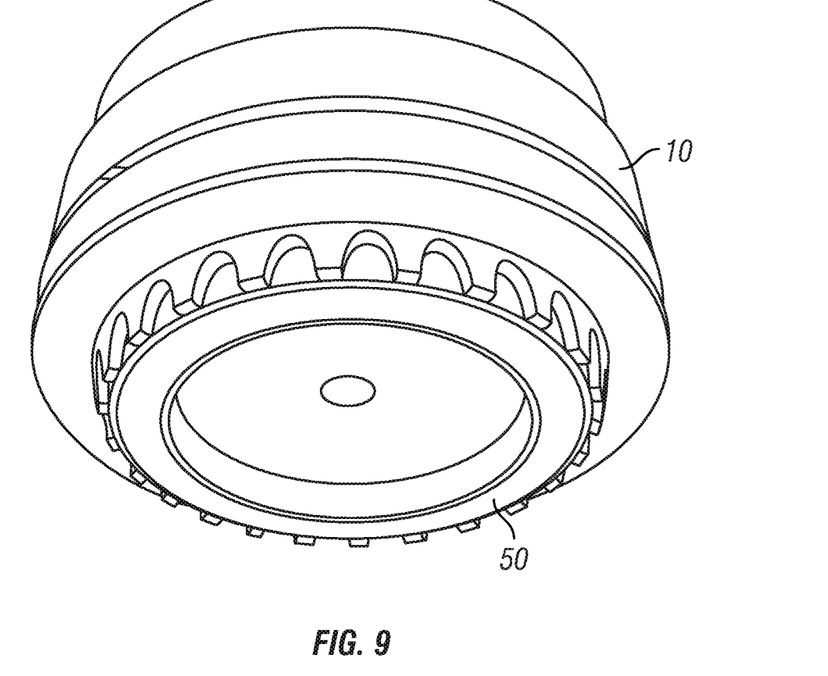
FIG. 9 is a view of a one implementation of a slip resistant material coupled to the bottom of a support structure.

FIG. 9 is a view of a one implementation of a slip resistant material 50 coupled to the bottom of a support structure 10.

Figure 10:
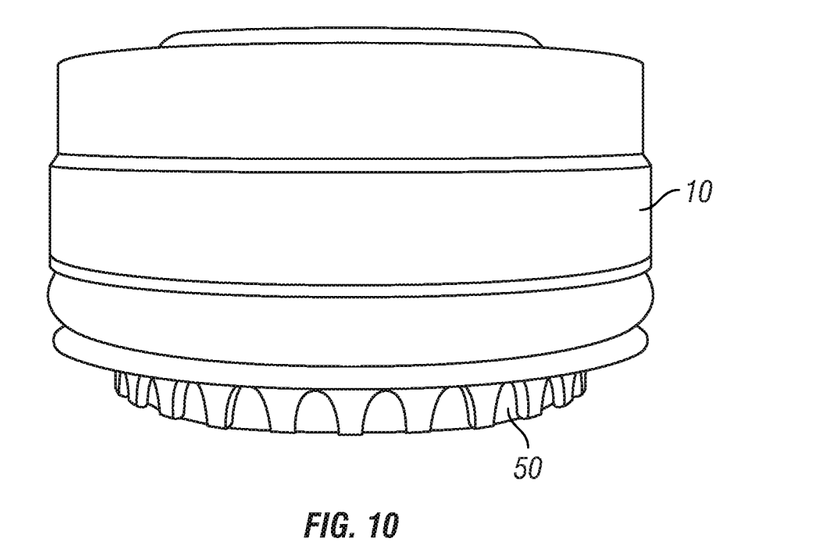
FIG. 10 is a view of a one implementation of a slip resistant material coupled to the bottom of a support structure and resting on an underlying surface.

FIG. 10 is a view of a one implementation of a slip resistant material 50 coupled to the bottom of a support structure 10 and resting on an underlying surface.

FIGS. 1-10 show some implementations of a support structure 10 for use with kick drums, floor toms, or other resonating and/or vibration-sensitive devices, comprising a resilient membrane 24 circumferentially/perimetrically suspended by a rigid frame 20 and containing in its center area a receptacle 22 as means of resilient support to and suspension of the instrument or equipment apart from its supporting surface or structure.

In some implementations, the resilient membrane 24 is an elastic or flexible spring-like planar material (such as an elastomer having durometer roughly 20 to 60 Shore A and thickness roughly 1 to 4 mm), or combination of such materials, designed and featured to maintain in suspension, upon its center area, the total (or proportional share if more than one support structure unit is used) of (i) the sum total static weight of (a) the instrument or equipment; (b) any used or required support means; (c) any added weight to the instrument or equipment (e.g., tom-tom drums, cymbals or other items and their support means mounted upon the instrument or equipment); combined with (ii) a range of dynamic forces typically exerted upon, against, under and/or by the instrument or equipment, as placed upon/against its supporting surface or structure under extreme conditions of normal application or operation.

In some implementations, the resilient membrane 24 has a centrally-located aperture or other captive means in its center area for accommodation of and securement by/to a receptacle 22.

In some implementations, the resilient membrane 24 has about its perimeter the means—such as an extension of material and/or features beyond the diameter of (or distance across) the rigid frame 20—to provide for retainment, and thus suspension, of the resilient membrane by/to the rigid frame.

In some implementations, the resilient membrane 24, or portions thereof, is in a state of equilibrium (unstrained) or induced strain in its suspension by the rigid frame 20 as appropriate to the resilient membrane's material(s), design, durometer, thickness, etc., and anticipated load-bearing and dynamic force-bearing duties mentioned previously. Also, some embodiments provide for the strain or tension of the resilient membrane to be adjustable, within its securement by/to the rigid frame, so to optimize performance characteristics specific to the application and/or for user preference.

In some implementations, the resilient membrane 24 has, in or through its planar surface, apertures, cavities or other like features arranged and numbered to provide (i) air-flow or visibility through the membrane, (ii) attachment points for the resilient membrane's accommodation of and securement by/to the centrally-located receptacle 22 and/or suspension by/to the rigid frame 20, and/or (iii) for any other purpose(s) advantageous to the performance of the resilient membrane/structure, in application and/or for benefit of appearance, manufacture or assembly.

In some implementations, the resilient membrane 24 has one or more concentric ribs, undulations, segments thereof, and/or other features in, rising above and/or below the planar surface of the resilient membrane to facilitate its engagement by/to the rigid frame 20 and/or by/to the centrally-located receptacle 22, or for any other purpose(s) advantageous to the performance of the resilient membrane/structure in application and/or for the benefit of appearance, manufacture or assembly.

In some implementations, the resilient membrane 24 comprises three or more radially-oriented springs, lengths of elastic cording or other similarly-resilient components/material, circumferentially/perimetrically suspended by the rigid frame 20.

Further design features and options of the resilient membrane 24 are articulated below as relate to its function as a suspension medium interspersed between other parts of the support structure. In some implementations, the receptacle 22 is a rigid, cup-like container affixed within the resilient membrane's centrally-located aperture (or other means for accommodation of and securement by/to the receptacle) as means for locating, containing and/or supporting the instrument or equipment and having an interior/core structure 34, upper circumferential support edge 30 and facing portion 28.

In some implementations, the receptacle 22, or at minimum its interior/core structure 34, upper circumferential support edge 30 and facing portion 28, are constructed substantially of stiff plastic, hard elastomer or other durable, abrasion-resistant, rigid material, and sized, contoured and featured to allow removable, angular placement (roughly 15-165 degrees) within the receptacle (see FIGS. 5 and 6), or at 90 degrees atop the upper circumferential support edge or about the facing portion, of the distal end 12 of a support leg/stand 14 or other support means—including any attachments thereto or features thereof common in the art (e.g., rubber foot, spiked end, etc.)—of the instrument or equipment.

In some implementations, the receptacle 22 is located vertically (i.e., with its opening facing upwards) within the center area of the resilient membrane 24 such that the resilient membrane horizontally (yet circumferentially) bisects the receptacle's length, thus delineating the receptacle's upper portion (i.e., the upper circumferential support edge 30 and the facing portion 28) and lower portion—such that the resilient membrane becomes a supporting flange around the circumference of the receptacle.

In some implementations, the receptacle 22 is located atop or substantially below the surface of the resilient membrane 24, and therefore not bisected by the resilient membrane.

In some implementations, the containment of the receptacle 22 within the center area of the resilient membrane 24 is accomplished by mechanical and/or adhesive means—or further, as preferred, as a result of being molded together to create one bonded, multi-material part while yet preserving the unique properties and purposes of the parts, and their relationship, as described herein.

In some implementations, the containment of the receptacle 22 within the center area of the resilient membrane 24 is accomplished by means of a receiving cavity formed within the resilient membrane for the insertion and captivation of the receptacle, thereby effectively uniting both into one multi-material part while yet preserving the unique properties and purposes of the parts, and their relationship, as described herein.

In some implementations, the receptacle 22 comprises two separate mating portions, the receptacle's upper portion (i.e., the upper circumferential support edge 30 and the facing portion 28) and lower portion, whereby a means of mechanical, adhesive or other engagement of both portions captivates the edge of the resilient membrane 24 centrally-located aperture, proximate concentric ribs, undulations, segments thereof and/or other features in, rising above and/or below the planar surface of the resilient membrane, thereby achieving the containment of the receptacle within the center area of the resilient membrane creating one multi-material part while yet preserving the unique properties and purposes of the receptacle and the resilient membrane, and their relationship, as described herein.

In some implementations, the receptacle 22 provides—by means of its material(s) and design—surfaces and/or features (e.g., threads) within the interior/core structure 34, atop the upper circumferential support edge 30 and/or about the facing portion 28 with which to mate and/or otherwise accommodate (temporarily or permanently, at time of manufacture or as needed per application) anticipated additional inserts or other adaptive devices interspersed between the receptacle and the distal end of a support leg/stand or other support means of the instrument or equipment for the anticipated purpose of accommodating, and in some use-cases retaining, broader variations in the distal end of a support leg/stand or other support means—particularly attachments thereto or characteristics thereof common in the art—thus extending the benefits of the support structure to instruments or equipment less suitably configured for use of the support structure.

In some implementations, if the resilient membrane 24 is comprised of the radially-oriented springs or other similarly-resilient components/material, similarly circumferentially/perimetrically suspended by the rigid frame 20, the suspension is achieved by means of radially-oriented attachment points, apertures, or other load-bearing features added to or formed within/about the circumference/perimeter of the receptacle 22 and the rigid frame—to which the radially-oriented springs or other similarly-resilient components/materials may be attached thereby providing the containment of the receptacle within the center area of the resilient membrane—such that the radially-oriented springs or other similarly-resilient components/materials become the supporting flange around the circumference of the receptacle.

In some implementations, the upper circumferential support edge 30, has attached, molded or otherwise secured to and/or across its surface—or secured as such by means of attachment to the interior/core structure 34 or facing portion 28—a circumferentially suspended compliant membrane 32 which, being an abrasion-resistant elastomer or other elastic planar material, and having a central aperture of a diameter less than the base diameter of the distal end of a support leg/stand or other support means—including any attachments thereto or features thereof common in the art (e.g. rubber foot), partially occludes the opening of the receptacle 22 such to allow insertion of the distal end of the support leg/stand to pass substantially through the aperture and into the receptacle, so that (i) there is minimal ongoing contact between the distal end (or adjacent shaft) of the support leg/stand and the circumferentially suspended compliant membrane during application or performance (thus not damping resonance of the instrument or equipment), and (ii) when/if the instrument or equipment is lifted from its supporting surface or structure (e.g., for purposes of relocation), the distal end of the support leg/stand frictionally engages the lesser diameter of the circumferentially suspended compliant membrane's central aperture such that the support structure does not readily decouple (see FIGS. 5, 6 and 7).

In some implementations, the circumferentially suspended compliant membrane 32 as secured to and/or across the surface of the receptacle's upper circumferential support edge 30 also provides a surface and underlying structure to compliantly accommodate and support anticipated variations in the distal end of a support leg/stand or other support means whose footprint, dimensions and/or shape preclude insertion through the circumferentially suspended compliant membrane's central aperture (and into the receptacle 22) thus accommodating and extending the benefits of the support structure to instruments or equipment so configured.

In some implementations, if the circumferentially suspended compliant membrane 32 is secured by means of attachment to the facing portion 28, then the outer surface of that attachment means may provide—in similar ways to the optional surface features of the facing portion itself—the means with which to mate and/or otherwise accommodate the anticipated inserts or other adaptive devices mentioned previously.

In some implementations, if the containment of the receptacle 22 within the center area of the resilient membrane 24 is accomplished by means of being molded together to create one bonded, multi-material part, then—by means of such forming—the resilient membrane may provide not only the circumferentially suspended compliant membrane 32—such that the circumferentially suspended compliant membrane need not be a separate part nor attached, molded or otherwise secured to the receptacle's upper circumferential support edge 30—but an exterior surface to the facing portion 28 as well, which—in similar ways to the optional surface features of the facing portion itself—may provide the means with which to mate and/or otherwise accommodate the anticipated inserts or other adaptive devices mentioned previously.

In some implementations, if the containment of the receptacle 22 within the center area of the resilient membrane 24 is accomplished by means of the receiving cavity formed within the resilient membrane (for the insertion and captivation of the receptacle), the receiving cavity may, in addition—by means of its forming—provide not only the circumferentially suspended compliant membrane 32—such that the circumferentially suspended compliant membrane need not be a separate part nor attached, molded or otherwise secured to the receptacle's upper circumferential support edge 30—but an exterior surface to the facing portion 28 as well, which—in similar ways to the optional surface features of the facing portion itself—may provide the means with which to mate and/or otherwise accommodate the anticipated inserts or other adaptive devices mentioned previously.

In some implementations, the receptacle 22—as contained within the resilient membrane 24 and suspended by the rigid frame 20—has its upper circumferential support edge 30 extending above the top edge of the rigid frame to provide a support means for instruments or equipment either not equipped with support legs/stands or whose support is or can be the surface or structure of the device itself (e.g., amplifiers, speaker cabinets, etc.), such that the instrument or equipment is allowed full advantage of the support structure as a platform support rather than a receptacle.

In some implementations, the rigid frame 20 is a shallow, cylindrical or other shaped structural means, with a height roughly half its diameter (or distance across), for the load/force-bearing circumferential/perimetric suspension of the resilient membrane 24, and connected to and supported about its perimeter by an isolating loop of resilient material 46 (FIG. 4) or by only itself.

In some implementations, the rigid frame 20 comprises two concentric, cylindrical or other shaped components—an inner bearing edge 26 and an outer cuff 36—which together, by means of interconnection to each other, and/or to the perimeter or extended features of the resilient membrane 24 there interspersed, provide not only the means for secure captivation and suspension of the resilient membrane, but a bottom support means 40 for the rigid frame's connection to and support by the loop of resilient material 46.

In some implementations, the outer cuff 36, as the externally-apparent support means to the resilient membrane 24, is constructed of stiff plastic, hard elastomer or other durable, rigid material, having a height, diameter (or distance across), wall thickness and other features appropriate to (i) encapsulate the inner bearing edge 26—together with, upon and over which the resilient membrane is placed or stretched (thereby its perimeter or extended features interspersed between the inner bearing edge and outer cuff) and (ii) interconnect with the inner bearing edge and/or the perimeter or extended features of the resilient membrane interspersed between the inner bearing edge and outer cuff such to secure the suspension of the resilient membrane by the rigid frame 20.

In some implementations, the inner bearing edge 26, as the internal support means of the resilient membrane 24, is constructed of stiff plastic, hard elastomer or other durable, rigid material, having a height and diameter (or distance across) less than that of the outer cuff 36, a wall thickness and other features appropriate to provide (i) the load/force-bearing upper surface to, and circumferential/perimetric support of, the resilient membrane which, once placed upon or stretched over the inner bearing edge, are together encapsulated by and interconnected with the outer cuff, (ii) the means by which to interconnect with the outer cuff and/or the perimeter or extended features of the resilient membrane interspersed between the inner bearing edge and outer cuff such to secure the suspension of the resilient membrane by the rigid frame 20, and (iii) a 90 degree flanged bottom portion (i.e., one type of the bottom support means 40) extending radially outward, underneath the outer cuff (once interconnected), proximate to the outer perimeter of the outer cuff, and of thickness equal to support—either by itself or with supported connection to the bottom surface of the outer cuff—the total load/force-bearing duties of all components above the rigid frame's connection to and support by the loop of resilient material 46.

In some implementations, the inner bearing edge 26 flanged bottom portion has (i) bottom surface features whereby to securely engage/mate—by mechanical, adhesive, self-molding and/or other means—the loop of resilient material 46 such that the rigid frame 20 contacts/engages, and is thus supported by, the upper-most surface area of the loop of resilient material or (ii) a 'toothed' surface/feature comprising downwardly extending protrusions 44 of appropriate length, thickness, contour, taper and spacing such to provide for non-destructive penetration into, and thus strong laterally-resistant retention to, the supporting surface or structure when the supporting surface or structure comprises a textured rug, carpet, mat or other penetrable surface or treatment upon/against which the support structure may be placed for use without employing the loop of resilient material and a base plate 42.

In some implementations, the rigid frame 20 comprises only one component, either the outer cuff 36 or the inner bearing edge 26 (each as may be modified to support functionality as described herein) to which the resilient membrane 24 is securely attached (by mechanical, adhesive, self-molding and/or other means) and suspended.

In some implementations, the bottom support means 40 comprises the bottom of the inner bearing edge 26 (without its flanged bottom portion), the bottom of the outer cuff 36, or both (as may be modified to support functionality as described herein), and having (i) bottom surface features whereby to securely engage/mate—by mechanical, adhesive, self-molding and/or other means—the loop of resilient material 46 such that the rigid frame 20 contacts/engages, and is thus supported by, the upper-most surface area of the loop of resilient material, or (ii) a 'toothed' surface/feature comprising downwardly extending protrusions 44 of appropriate length, thickness, contour, taper and spacing such to provide for non-destructive penetration into, and thus strong laterally-resistant retention to, the supporting surface or structure when the supporting surface or structure comprises a textured rug, carpet, mat or other penetrable surface or treatment upon/against which the support structure may be placed for use without employing the loop of resilient material and a base plate 42.

In some implementations, the rigid frame 20 is of appropriate mass, and thus inertia, to optimize performance characteristics specific to the application.

In some implementations, the interconnection of the outer cuff 36 and the inner bearing edge 26—while continuing to provide (by means previously stated) the captivation and secure suspension of the resilient membrane 24 by the rigid frame 20—comprises a threaded (or other adjustable) engagement whereby rotation of the outer cuff or the inner bearing edge against the other provides not only the means of interconnecting these components (with the perimeter or extended features of the resilient membrane there interspersed) but the potential, thereby, to change the force of strain of the resilient membrane across the inner bearing edge thus enabling adjustment to the tension of suspension of the resilient membrane within the rigid frame to optimize performance characteristics specific to the application.

In some implementations, the top edge of the inner bearing edge 26 provides—by its shape, the addition of captive roller bearing(s) and/or other surface treatments—a friction reducing means by which to help equalize the strain of the resilient membrane 24 between its circumferential/perimetric attachment to and captivation by the rigid frame 20 and suspension across the inner bearing edge particularly when the interconnection between the outer cuff 36 and the inner bearing edge comprise the aforementioned threaded/adjustable engagement.

In some implementations, the loop of resilient material 46, or individual segments thereof, are retainedly interspersed between and about the perimeter of the rigid frame 20 and the base plate 42, as means of joining yet separating the rigid frame and the base plate in a flexible, supported, isolating engagement.

In some implementations, the loop of resilient material 46 is an elastomer or other resilient, spring-like material, or combination of such materials having dimensions, durometer and cross-sectional profile appropriate to maintain in supported, resilient suspension the total (or proportional share if more than one structure unit is used) of (i) the sum total static weight of (a) the instrument or equipment; (b) any used or required support means; (c) any added weight to the instrument or equipment (e.g., tom-tom drums, cymbals or other items and their support means mounted upon the instrument or equipment) once placed within, upon or about the receptacle 22 suspended by the resilient membrane 24 within the rigid frame 20; combined with (ii) a range of dynamic forces typically exerted upon, against, under and/or by the instrument or equipment, as placed upon/against its supporting surface or structure, under extreme conditions of normal application or operation.

In some implementations, the loop of resilient material 46 provides in its top and bottom surfaces, features or means by which to securely engage/mate (by mechanical, adhesive, self-molding and/or other means) the bottom support means 40 bottom surface and/or features (disposed to mate the loop of resilient material) and the base plate 42 top surface and/or features (similarly disposed to mate the loop of resilient material) such that the rigid frame 20 contacts/engages, and is thus supported by, the upper-most surface area and/or features of the loop of resilient material, while the base plate contacts/engages the lower-most surface area and/or features of the loop of resilient material.

In some implementations, the loop of resilient material 46 provides (i) isolation, support and retention between the rigid frame 20 and the base plate 42, effectively flexibly decoupling while yet securing the decouplement of the upper and lower portions of the support structure, and (ii) the resilient capacity to absorb and return a range of dynamic forces belonging to (a) the instrument or equipment placed within, upon or about the receptacle 22 suspended by the resilient membrane 24 within the rigid frame when the instrument or equipment is played or activated by the user, (b) the supporting surface or structure upon/against which the support structure is placed, and/or (c) the environment in which the instrument or equipment is located.

In some implementations, the loop of resilient material 46 comprises a hollow tube, bladder or segments thereof either empty or filled with air, gas, liquid or other substances or materials suitable to effectively flexibly decouple while yet securing the decouplement of the upper and lower portions of the support structure.

In some implementations, the loop of resilient material 46 is augmented or replaced by arrays of magnets mounted in/on the lower perimeter of the rigid frame 20 or its bottom support means 40 and the upper perimeter or surface of the base plate 42 such to provide a magnetic field of both attraction and repulsion to effectively flexibly decouple while yet securing the decouplement of the upper and lower portions of the support structure.

In some implementations, the base plate 42 is a thin circular or other shaped disk of stiff plastic, hard elastomer or other durable, rigid material, sized approximate to the diameter or outer perimeter of the rigid frame 20 and loop of resilient material 46, providing—as engaged to/by the loop of resilient material—the base support of all the above components/assemblies together with the aforementioned weights and forces of the instrument or equipment, and the interface to the supporting surface or structure upon/against which the support structure is placed.

In some implementations, the base plate 42 top surface has features or other means whereby to securely engage/mate—by mechanical, adhesive, self-molding and/or other means—the loop of resilient material 46 lower-most surface and/or features.

In some implementations, the base plate 42 has, from its bottom surface, teeth-like protrusions 44 of appropriate length (e.g., approximately ¼"), thickness, contour, taper and spacing extending downward in one or more circular, concentric or other patterns—or segments thereof—being molded, affixed or mechanically attached (e.g., by snap-in or threaded means) to the base plate, as means of providing for non-destructive penetration into, and thus strong laterally-resistant retention of the support structure to, the supporting surface or structure when the supporting surface or structure comprises a textured rug, carpet, mat or other penetrable surface or treatment upon/against which the support structure may be placed for use.

In some implementations, the one or more circular, concentric or other patterns—or segments thereof—of protrusions 44, together with the base plate 42 adjacent bottom surface (or other similarly disposed surface adjacent to the protrusions, if needed to support the protrusions when/if mechanically attached) provide one or more L or U-shaped channels for the addition and captivation of a removable loop, multiple loops, concentric loops, pads or other suitable configurations or segments of a slip-resistant material 50 (FIGS. 8-10), which, once pressed and secured in place (see FIG. 9), extends slightly below the distal ends of the protrusions such that the slip-resistant material becomes the material and surface (as configured for maximum grip-ability) supportingly interspersed between the base plate (i.e., the entire support structure) and the supporting surface or structure, and thus the means of providing strong laterally-resistant retention of the support structure to the supporting surface or structure when the supporting surface or structure comprises a smoother, less-textured, less-penetrable surface or treatment (e.g., wood, stone, tile, etc.) (see FIG. 10).

In some implementations, the slip-resistant material 50 is sized and featured compatibly to allow removable, frictional securement to the rigid frame 20 and/or the facing portion 28 of the receptacle 22 as means of storage of the slip-resistant material when it is not employed as the support and retention means of the support structure to/against its supporting surface or structure.

In some implementations, the slip-resistant material 50 may be permanently connected to the bottom surface of the base plate 42 if either the protrusions 44 or the slip-resistant material provides (by alternative design and connection means) such vertical, mechanically-adjustable means (e.g., by threaded), such that one may be optionally extended below or retracted above the other by the user.

In some implementations, the rigid frame 20 'toothed' surface/feature (employed without use of the loop of resilient material 46 and the base plate 42) or the base plate's protrusions 44 (employed with use of the loop of resilient material and the base plate), as previously described, have a slip-resistant treatment added or molded to the distal ends of the 'toothed' surface/feature or protrusions such to provide—without use of the slip-resistant material—the means of strong laterally-resistant retention of the support structure to the supporting surface or structure regardless of its aforementioned penetrability or texture.

In some implementations, the rigid frame 20 'toothed' surface/feature (employed without use of the loop of resilient material 46 and the base plate 42) or the base plate's protrusions 44 (employed with use of the loop of resilient material and the base plate), as previously described, have a segmented arrangement and/or undulating heights such to enable the user's placement of the support structure upon/against the supporting surface or structure to straddle or otherwise mitigate seams, bumps, risers, deviations of flatness or other surface imperfections, discontinuities or destabilizing artifacts often encountered in the supporting surface or structure upon/against which the instrument or equipment is required (per space allotment or other constraints) to be placed, thereby increasing stability and securement of the instrument or equipment as employed with the support structure.

In some implementations, the base plate 42 has in its central area an aperture and/or slot, multiple apertures or other captive means whereby the base plate, thus the entire support structure, can be retainedly attached (by means of a common threaded or other type of fastener) to the supporting surface or structure so to preserve position and securement of the support structure according to where the user has chosen to set up the instrument or equipment for best application or performance upon/against such supporting surface or structure.

In some implementations, the slip-resistant material 50, its loop, multiple loops, concentric loops, pads or segments thereof, as configured for being pressed into one or more L or U-shaped channels extending from the base plate 42 bottom surface—and/or an additional adaptive device of similar purpose, configuration, material and size though approximately ½ the height of the slip-resistant material's loop(s) or pads—is connected by or integrated (as by means of being molded together) within a substrate of planar material comprised of the same substance as the slip-resistant material, another more rigid material or a combination of both, having a thickness approximately ⅓ the height of the slip-resistant material's loop(s) or pads, and has in its central area an aperture and/or slot, multiple apertures or other captive means whereby the slip-resistant material (or additional adaptive device) can be retainedly attached (by means of a common threaded or other type of fastener) to the supporting surface or structure, apart from the rest of the support structure, so to mark and preserve the location(s) where the user has chosen to set up the instrument or equipment upon/against its supporting surface or structure, thereby allowing the support structure to be pressed down upon, thus secured against lateral movement by, the slip-resistant material (or additional adaptive device) for application or performance of the instrument or equipment while also allowing the removal of the support structure (less the slip-resistant material or additional adaptive device) after the time of application or performance thereby enabling the supporting surface or structure (e.g., rug, mat, etc.) to be rolled or folded up, transported and/or stored more easily for the next application or performance of the instrument or equipment without losing the positions (e.g., 'memory') of where the support structures were chosen to be placed.

In some implementations, the slip-resistant material 50 or additional adaptive device as configured for being pressed into and separable from one or more L or U-shaped channels extending from the base plate 42 bottom surface, or the slip-resistant material as permanently connected to the bottom surface of the base plate, as previously described, have segmented arrangement and features—together with and/or by means of the bottom surface and/or channels of the base plate (with anticipated modification)—such to (i) enable the user's placement of the support structure upon/against the supporting surface or structure to straddle or otherwise mitigate seams, bumps, risers, deviations of flatness or other surface imperfections, discontinuities or destabilizing artifacts often encountered in the supporting surface or structure upon/against which the instrument or equipment is required (per space allotment or other constraints) to be placed, and (ii) allow segments of the slip-resistant material to articulate and/or move upwards or downwards independently, each as connected to or supported by a fulcrum, spring, ball and socket or other means, such to accommodate or mitigate seams, gaps, dips, risers, deviations of flatness or other surface imperfections, discontinuities or destabilizing artifacts often encountered in the supporting surface or structure upon/against which the instrument or equipment is required (per space allotment or other constraints) to be placed, thereby increasing stability and securement of the instrument or equipment as employed with the support structure.

The support structure described herein provides many advantages over the prior art, including but not limited to:

In some implementations, the support structure provides for angular insertion and retention of the support legs of a bass drum, cymbal or other instruments/equipment and their support stands which articulate in angles greater or less than 90 degrees to the underlying support structure (e.g. bass drums spurs, upright bass and cello end pins, instrument/equipment tripods, etc.). For example, in some implementations receptacle 22 accommodates both vertical and angular insertion of the support leg and the circumferentially suspended compliant membrane 32, as a collar with an aperture smaller than the diameter of the distal end (e.g. rubber foot) of the support leg, allows the distal end of the support leg to substantially pass through the aperture and so prevent decoupling of the device when the support leg or instrument is lifted from its underlying support structure.

In some implementations, the support structure described herein provides resilient bias for omni-directional (e.g. lateral) forces or vibrations of the instrument/equipment engaged in the device, or of those sometimes occurring in the underlying supporting structure, and flexibly decouples one from the other and secures such decouplement. For example, in some implementations the loop of resilient material 46, engaged between bottom support means 40 and base plate 42, provides a resilient bias for omni-directional micro-movement of the instrument/equipment independent of the adversely stationary or vibrating underlying supporting structure.

In some implementations, the support structure described herein provides resilient suspension of the support legs of a drum, cymbal or other instruments/equipment and their support stands above/from the underlying supporting structure. For example, in some implementations resilient membrane 24 as circumferentially suspended from rigid frame 20 relies not on compression and rebound of a solid base of material but on horizontal tension of its resilient membrane circumferentially secured by the rigid frame—as similar to a diaphragm or acoustic membrane which moves to and fro in a manner corresponding to the force activating it (in this case the movement and vibrations of the drum/instrument upon/against it). Without a mass or base of material underneath this resilient membrane it is free to provide the most sensitive, active and resilient bias to the movement and vibrations of the instrument which are transferred to its support leg(s).

In some implementations, the support structure described herein provides frictionless, undamped positional securement of/to the support leg(s) since lateral retention of the support leg's position within the device and the device's retention to the support leg (when the instrument is lifted from its underlying support structure) do not rely on substantial frictional engagement of the interior surfaces of the device to the exterior surfaces of the support leg. For example, in some implementations receptacle 22 concave, cup-like interior/core structure 34 provides for minimal frictional contact to the distal end of the support leg for every degree of angle anticipated in a support leg there inserted, such that more lateral forces transferred to the support leg are not damped (as when the support leg is encased in compressible foam to keep its position within the device). Further, the interior contours, diameters and depth of the receptacle in relation to the circumferentially suspended compliant membrane 32, secured across the receptacle's upper circumferential support edge 30, accommodate a range of attachments (e.g. rubber foot) to the distal end of the support leg common in the art, allowing the attachment to substantially pass through the circumferentially suspended compliant membrane's center aperture, such that once inserted into the device, the circumferentially suspended compliant membrane does not frictionally engage the exterior surfaces of the support leg (which if it did would promote undesired damping of movement/vibrations). Only when/if the instrument, thus coupled, is lifted from its supporting surface does the distal end of the support leg frictionally encounter the circumferentially suspended compliant membrane's center aperture and only to the degree needed to prevent the device from decoupling from the support leg.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A support structure for resonating and/or vibration-sensitive devices comprising:
   a rigid frame;
   a resilient membrane circumferentially/perimetrically suspended in the rigid frame; and
   a receptacle in the resilient membrane, the receptacle comprising an interior core structure, an upper circumferential support edge, a circumferentially suspended compliant membrane on the upper circumferential support edge, and a facing portion, wherein the receptacle allows removable, angular placement of a distal end of a support leg of a resonating and/or vibration-sensitive device, resiliently supporting and suspending the device apart from a supporting surface.

2. The support structure of claim 1 wherein the resilient membrane comprises an elastic planar material.

3. The support structure of claim 1 wherein the resilient membrane comprises a supporting flange around the receptacle.

4. The support structure of claim 1 wherein the receptacle comprises a rigid container affixed within a centrally-located aperture in the resilient membrane.

5. The support structure of claim 1 wherein the circumferentially suspended compliant membrane includes a central aperture of a diameter less than a base diameter of a distal end of a support leg.

6. The support structure of claim 1 wherein the rigid frame includes an isolating loop of resilient material interspersed between a bottom portion of the rigid frame and a base plate.

7. The support structure of claim 1 wherein the rigid frame includes a base plate connected to a plurality of downwardly extending protrusions to penetrate and engage a supporting surface.

8. The support structure of claim 7 wherein the downwardly extending protrusions are arranged in a circular pattern on a bottom surface of the base plate.

9. The support structure of claim 1 wherein the rigid frame includes a base plate connected to a slip-resistant material.

10. A support structure for resonating and/or vibration-sensitive devices comprising:
    a rigid frame;
    a resilient membrane comprising an elastic planar material circumferentially/perimetrically suspended in the rigid frame;
    a receptacle comprising a rigid container affixed within a centrally-located aperture in the resilient membrane, the receptacle including a circumferentially suspended compliant membrane including a central aperture of a diameter less than a base diameter of a distal end of a support leg, wherein the receptacle allows removable, angular placement of a distal end of a support leg of a resonating and/or vibration-sensitive device, resiliently supporting and suspending the device apart from a supporting surface.

11. The support structure for resonating and/or vibration-sensitive devices of claim 10 wherein the rigid frame includes an isolating loop of resilient material interspersed between a bottom portion of the rigid frame and a base plate.

12. The support structure for resonating and/or vibration-sensitive devices of claim 10 wherein the rigid frame includes a base plate connected to a plurality of downwardly extending protrusions to penetrate and engage a supporting surface.

13. The support structure for resonating and/or vibration-sensitive devices of claim 12 wherein the downwardly extending protrusions are arranged in a circular pattern on a bottom surface of the base plate.

14. The support structure for resonating and/or vibration-sensitive devices of claim 10 wherein the rigid frame includes a base plate connected to a slip-resistant material.

\* \* \* \* \*